United States Patent
Zheng

(10) Patent No.: US 9,519,053 B2
(45) Date of Patent: Dec. 13, 2016

(54) DISTANCE MEASURING APPARATUS AND DISTANCE MEASURING METHOD

(71) Applicant: JOY TECHNOLOGY(SHEN ZHEN)CO., LTD, Guangdong (CN)

(72) Inventor: Yu-Zheng Zheng, Sichuan (CN)

(73) Assignee: JOY TECHNOLOGY(SHEN ZHEN)CO., LTD, Guangdong (CN)

( * ) Notice: Subject to any disclaimer, the term of this patent is extended or adjusted under 35 U.S.C. 154(b) by 377 days.

(21) Appl. No.: 14/446,339

(22) Filed: Jul. 30, 2014

(65) Prior Publication Data

US 2015/0276924 A1 Oct. 1, 2015

(30) Foreign Application Priority Data

Mar. 26, 2014 (CN) .......................... 2014 1 0118186

(51) Int. Cl.
*G01S 19/13* (2010.01)
*G01S 3/02* (2006.01)
*G01S 11/14* (2006.01)
*G01S 15/74* (2006.01)

(52) U.S. Cl.
CPC ............... *G01S 11/14* (2013.01); *G01S 15/74* (2013.01); *G01S 19/13* (2013.01)

(58) Field of Classification Search
USPC ...... 342/357.2, 357.4, 357.51, 458; 701/468, 701/470
See application file for complete search history.

(56) References Cited

U.S. PATENT DOCUMENTS

| | | | | |
|---|---|---|---|---|
| 2006/0065055 A1* | 3/2006 | Barshinger | .............. | B61K 9/10 |
| | | | | 73/609 |
| 2012/0087212 A1* | 4/2012 | Vartanian | ................ | G01S 15/08 |
| | | | | 367/118 |
| 2013/0268185 A1* | 10/2013 | Rabbath | ................. | G05D 1/021 |
| | | | | 701/300 |
| 2013/0336093 A1* | 12/2013 | Suvanto | .................. | G01S 15/06 |
| | | | | 367/99 |
| 2015/0156637 A1* | 6/2015 | Li | .......................... | G01S 1/725 |
| | | | | 455/454 |

* cited by examiner

*Primary Examiner* — Dao Phan
(74) *Attorney, Agent, or Firm* — CKC & Partners Co., Ltd.

(57) ABSTRACT

A distance measuring apparatus and a distance measuring method are provided. The distance measuring apparatus includes a GPS module, an ultrasound transceiver module and a control module. The GPS module is configured to generate a pulse signal. The ultrasound transceiver module is configured to generate and transmit a first ultrasound signal and receive a second ultrasound signal transmitted from an object. When the control module receives the pulse signal, the control module controls the ultrasound transceiver module to generate and transmit the first ultrasound signal, and determines whether the ultrasound transceiver module receives the second ultrasound signal within a first interval. When the ultrasound transceiver module receives the second ultrasound signal within the first interval, the control module determines a distance between the distance measuring apparatus and the object according to a time difference.

10 Claims, 4 Drawing Sheets

DISTANCE MEASURING APPARATUS AND DISTANCE MEASURING METHOD

RELATED APPLICATIONS

This application claims priority to China Application Ser. No. 201410118186.0 filed Mar. 26, 2014, which is herein incorporated by reference.

BACKGROUND

Technical Field

The present disclosure relates to a distance measuring apparatus and a distance measuring method. More particularly, the present disclosure relates to a distance measuring apparatus and a distance measuring method for detecting a distance between driving vehicles.

Description of Related Art

The conventional distance measuring method is transmitting an ultrasound signal and receiving the ultrasound signal reflected from an object by an ultrasound transceiver device, so as to calculate a distance between the ultrasound transceiver device and the object. The distance can be obtained by multiplying the speed of sound by a time difference and dividing a multiplied value by 2, in which the time difference is between a time when the reflected ultrasound is received and a time when the ultrasound is transmitted. However, the smaller the reflected area of the object is, the worse accuracy of the distance measured by the conventional method becomes. Therefore, the conventional method is unable to effectively detect a distance between moving vehicles. Moreover, the farther the object is from the ultrasound transceiver device, the longer the time is for receiving the reflected ultrasound signal by the ultrasound transceiver device is, i.e., the worse the received signal. According to the result of an experiment, a distance detected by the conventional method is unable to exceed 10 meters. Therefore it is inadequate to detect a distance between moving vehicles.

Aiming at a moving vehicle, there is another method for detecting positions of other moving vehicles. In particular, each of moving vehicles uploads its position to a server by a global positioning system (GPS) and calculates a distance by the server according to each position of moving vehicles, However, it is unable to detect real-time positions of other moving vehicles by the GPS, which the efficiency is limited by data upload/download rates through communication networks. Accordingly, both of the aforementioned methods cannot provide accurate and immediate information of a distance between the moving vehicles for the drivers.

SUMMARY

In order to solve the aforementioned problems, the present disclosure is to provide a distance measuring apparatus and a distance measuring method. Through synchronously and precisely generating a pulse signal by the GPS module, receiving an transmitted ultrasound signal and calculating a time difference between receiving the ultrasound signal and transmitting the ultrasound signal by the distance measuring apparatus, the driver can immediately determine a distance between the moving vehicle itself and another vehicle.

One aspect of the present disclosure is to provide a distance measuring apparatus. The distance measuring apparatus includes a global positioning system (GPS) module, an ultrasound transceiver module and a control module. The GPS module is configured to generate a pulse signal. The ultrasound transceiver module is configured to generate and transmit a first ultrasound signal and receive a second ultrasound signal transmitted from an object. The control module is electrically coupled to the GPS module and the ultrasound transceiver module. When the control module receives the pulse signal, the control module controls the ultrasound transceiver module to generate and transmit the first ultrasound signal, and determines whether the ultrasound transceiver module receives the second ultrasound signal within a first interval. When the ultrasound transceiver module receives the second ultrasound signal within the first interval, the control module determines a distance between the distance measuring apparatus and the object according to a time difference between a time of receiving the second ultrasound signal and a time of transmitting the first ultrasound signal.

According to one embodiment of the present disclosure, the ultrasound transceiver module includes an ultrasound transmitting unit and an ultrasound receiving unit. The ultrasound transmitting unit is configured to transmit the first ultrasound signal. The ultrasound receiving unit is configured to receive the second ultrasound signal. When the control module receives the pulse signal, the control unit activates the ultrasound transmitting unit to transmit the first ultrasound signal.

According to one embodiment of the present disclosure, the control module inactivates the ultrasound transmitting unit to stop transmitting the first ultrasound signal after a second interval since the control unit activates the ultrasound transmitting unit.

According to one embodiment of the present disclosure, the control unit activates the ultrasound receiving unit to receive the second ultrasound signal after a third interval since the control unit inactivates the ultrasound transmitting unit.

According to one embodiment of the present disclosure, when the ultrasound receiving unit does not receive the second ultrasound signal within the first interval, the control unit inactivates the ultrasound receiving unit.

According to one embodiment of the present disclosure, the distance measuring apparatus further includes an alert module. The alert module is electrically coupled to the control module, and configured to generate an alert signal. When the time difference is shorter than a threshold time, the control module activates the alert module to generate the alert signal.

According to one embodiment of the present disclosure, the threshold interval is an interval for the second ultrasound signal traveling through a safe distance.

Another aspect of the present disclosure is to provide a distance measuring method. The distance measuring method includes receiving a pulse signal generated from a GPS module; generating and transmitting a first ultrasound signal according to the pulse signal; determining whether a second ultrasound signal is received within a first interval; and determining a distance according to a time difference when the second ultrasound signal is received within the first interval, wherein the time difference is between a time of receiving the second ultrasound signal and a time of transmitting the first ultrasound signal.

According to one embodiment of the present disclosure, the distance measuring method includes stopping transmitting the first ultrasound signal after a second interval since receiving the pulse signal.

According to one embodiment of the present disclosure, the step of determining whether the second ultrasound signal is received within the first interval includes determining whether the second ultrasound signal is received within the first interval after a third interval since stopping transmitting the first ultrasound signal To sum up, through synchronously and precisely generating a pulse signal by the GPS module, receiving an transmitted ultrasound signal and calculating a time difference between a time of receiving the ultrasound signal and a time of transmitting the ultrasound signal by the distance measuring apparatus, the driver can immediately detect whether a vehicle approaches the moving vehicle itself within a safe distance. Moreover, a distance between a vehicle with the distance measuring apparatus and another vehicle can be determined more precisely, and a detectable distance can be increased up to hundreds meters.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
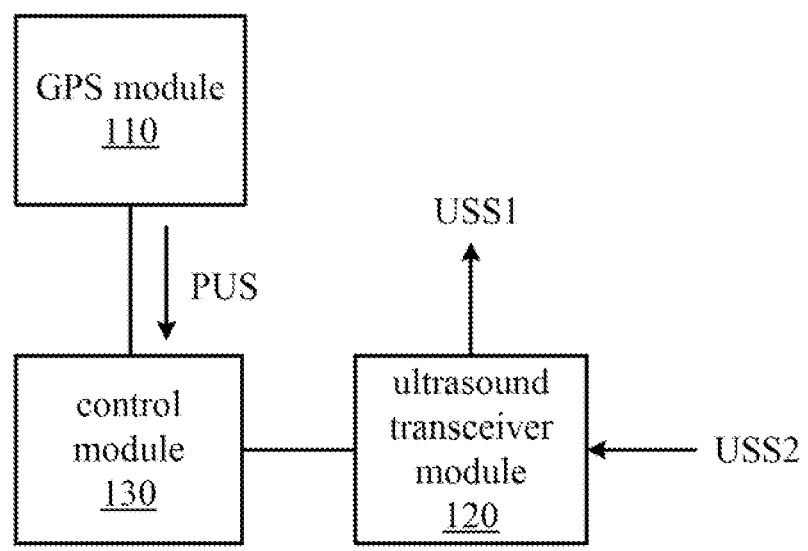
FIG. 1 depicts a block diagram of a distance measuring apparatus according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The reference is made to FIG. 1. FIG. 1 depicts a block diagram of a distance measuring apparatus 100 according to one embodiment of the present disclosure. In one embodiment, the distance measuring apparatus 100 may be disposed in a moving vehicle and configured to detect whether other vehicles approach the moving vehicle, but the present disclosure is not limited thereto. The distance measuring apparatus 100 includes a global positioning system (GPS) module 110, an ultrasound transceiver module 120 and a control module 130. The GPS module 110 is configured to generate a pulse signal PUS. The ultrasound transceiver module 120 is configured to generate and transmit a first ultrasound signal USS1, and receives a second ultrasound signal USS2 transmitted from an object (e.g., another moving vehicle). The control module 130 is electrically coupled to the GPS module 110 and the ultrasound transceiver module 120. When the control module 130 receives the pulse signal PUS, the control unit 130 controls the ultrasound transceiver module 120 to generate and transmit the first ultrasound signal USS1. In addition, the control module 130 further determines whether the ultrasound module 120 receives the second ultrasound signal USS2 transmitted from another moving vehicle within a first interval T1. When the ultrasound transceiver module 120 receives the second ultrasound signal USS2 within the first interval T1, the control module 130 determines a distance between the distance measuring apparatus 100 and the object (e.g. another moving vehicle) according to a time difference between a time when the second ultrasound signal USS2 is received and a time when the first ultrasound signal USS1 is transmitted.

In one embodiment, the pulse signal PUS may be a pulse signal per second (PPS). Since a time error between a time of transmitting PPS from the GPS and a coordinated universal time is smaller than a microsecond, PPS is adequate to be taken as a basis of synchronous timing.

In one embodiment, when control module 130 receives the pulse signal PUS generated from the GPS module 110, the control module 130 controls the ultrasound transceiver module 120 to generate and transmit the first ultrasound signal USS1, and tags a time of transmitting the first ultrasound signal USS1 to be time t0. Next, the control module 130 determines whether the ultrasound transceiver module 120 receives the second ultrasound signal USS2 transmitted from another vehicle within the first interval T1.

When the ultrasound transceiver module 120 receives the second ultrasound signal USS2 transmitted from another vehicle within the first interval T1, the control module 130 tags a time of receiving the second ultrasound signal USS2 to be time t1. Next, the control module 130 determines a distance between the distance measuring apparatus 100 and another vehicle according to a time difference 0140) between the time t1 of receiving the second ultrasound signal USS2 and the time t0 of transmitting the first ultrasound signal USS1. The distance can be obtained by multiplying a speed of sound at a certain temperature by the time difference. For example, the speed of sound is 340 meters per second at 25° C., the control module 130 may determines a distance between the distance measuring apparatus 100 and the object by a formula: 340×(t1−t0).

In one embodiment, other moving vehicles may include the distance measuring apparatuses 100, too. Therefore, when the GPS module 110 synchronously generates the pulse signal PUS, all vehicles generate and transmit the first ultrasound signal USS1 according to the pulse signal PUS. If one of the moving vehicles receives the second ultrasound signal USS2 (i.e., the first ultrasound signal USS1 transmitted from another moving vehicles), the moving vehicle may determine a distance between the moving vehicle and another moving vehicle according to a time difference between a time of receiving the second ultrasound signal USS and a time of transmitting the first ultrasound signal USS1.

Since a synchronous timing error is not larger than 1 microsecond when the GPS module 110 generates the pulse signal PUS, a time error may not be larger than 1 microsecond when the distance measuring apparatus 100 receives the second ultrasound signal USS2 from another vehicle. In other words, an error between the distance measuring apparatus 100 and another vehicle may not be larger than 1 millimeter. Accordingly, the distance measuring apparatus 100 can precisely determines a distance between the distance measuring apparatus 100 and another vehicle, and a length of a detectable distance can be enhanced.

Furthermore, a length of the interval T1 can de determined by the environment and the user's demand. In one embodiment, a length of the interval T1 is shorter than 1 second, e.g. 0.9 second. The calculated distance is substantially 300 meters. Generally, a driver can react to other vehicles within an appropriate range (e.g., 300 meters). In other words, the interval T1 is unnecessary to be too long. An appropriate first interval T1 can be set within 1 second. Therefore, the control module 130 can finish one detection in each pulse signal PUS generated from the GPS module 110 such that efficiency of the GPS module 110 can be optimized.

Moreover, when the control module 130 determines that the ultrasound transceiver module 120 does not receive the second ultrasound signal USS2 within the first interval T1, the control module 130 determines that there is no vehicle approaching the distance measuring apparatus 100 within the appropriate range. At this time, the control module 130 controls the ultrasound transceiver module 120 to stop receiving the second ultrasound signal USS2. Next, when the GPS module 110 generates the pulse signal PUS again, the control module 130 controls the ultrasound transceiver module 120 to repeat forgoing operations so as to detect whether other vehicles approach the distance measuring apparatus 100.

Figure 2:
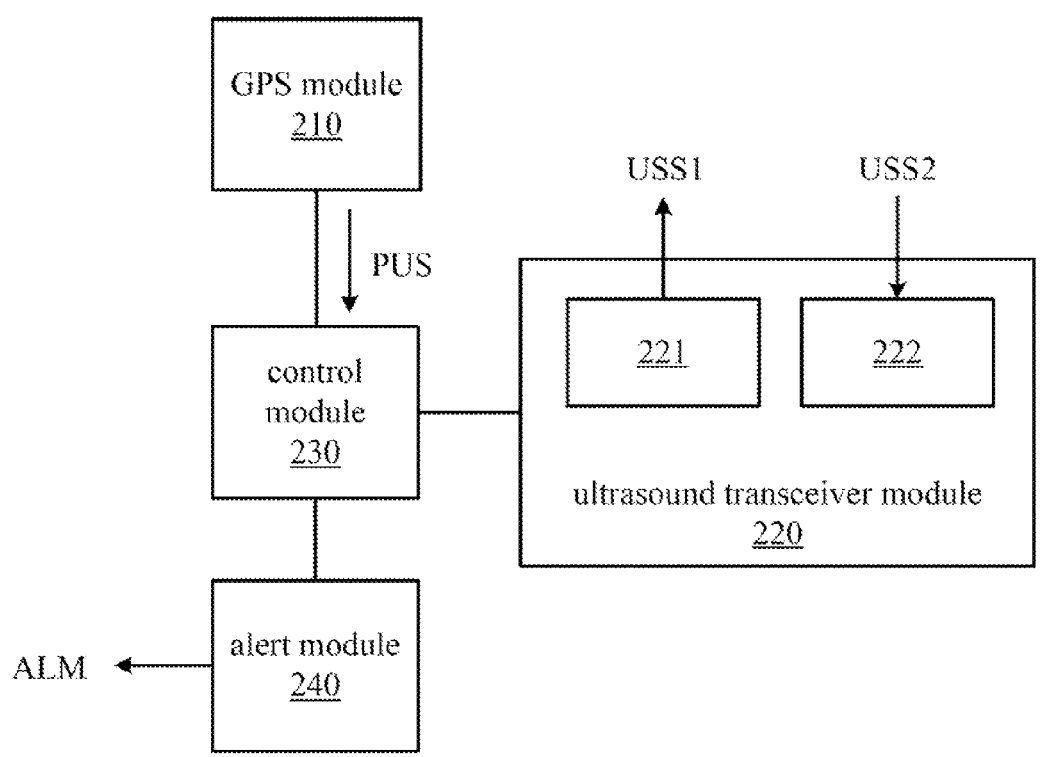
FIG. 2 depicts a block diagram of a distance measuring apparatus according to another embodiment of the present disclosure.

Reference is made to FIG. 2. FIG. 2 depicts a block diagram of a distance measuring apparatus 200 according to another embodiment of the present disclosure. In the present embodiment, the distance measuring apparatus 200 includes a GPS module 210, an ultrasound transceiver module 220, a control module 230 and an alert module 240. Similarly, the GPS module 210 is configured to generate a pulse signal PUS. The ultrasound transceiver module 220 includes an ultrasound transmitting unit 221 and an ultrasound receiving unit 222. The ultrasound transmitting unit 221 is configured to transmit a first ultrasound signal USS1. The ultrasound receiving unit 222 is configured to receive a second ultrasound signal USS2. The control module 230 is electrically coupled to the GPS module 210, the ultrasound transceiver module 220 and the alert module 240. The alert module 240 is configured to generate an alert signal ALM.

Figure 3:
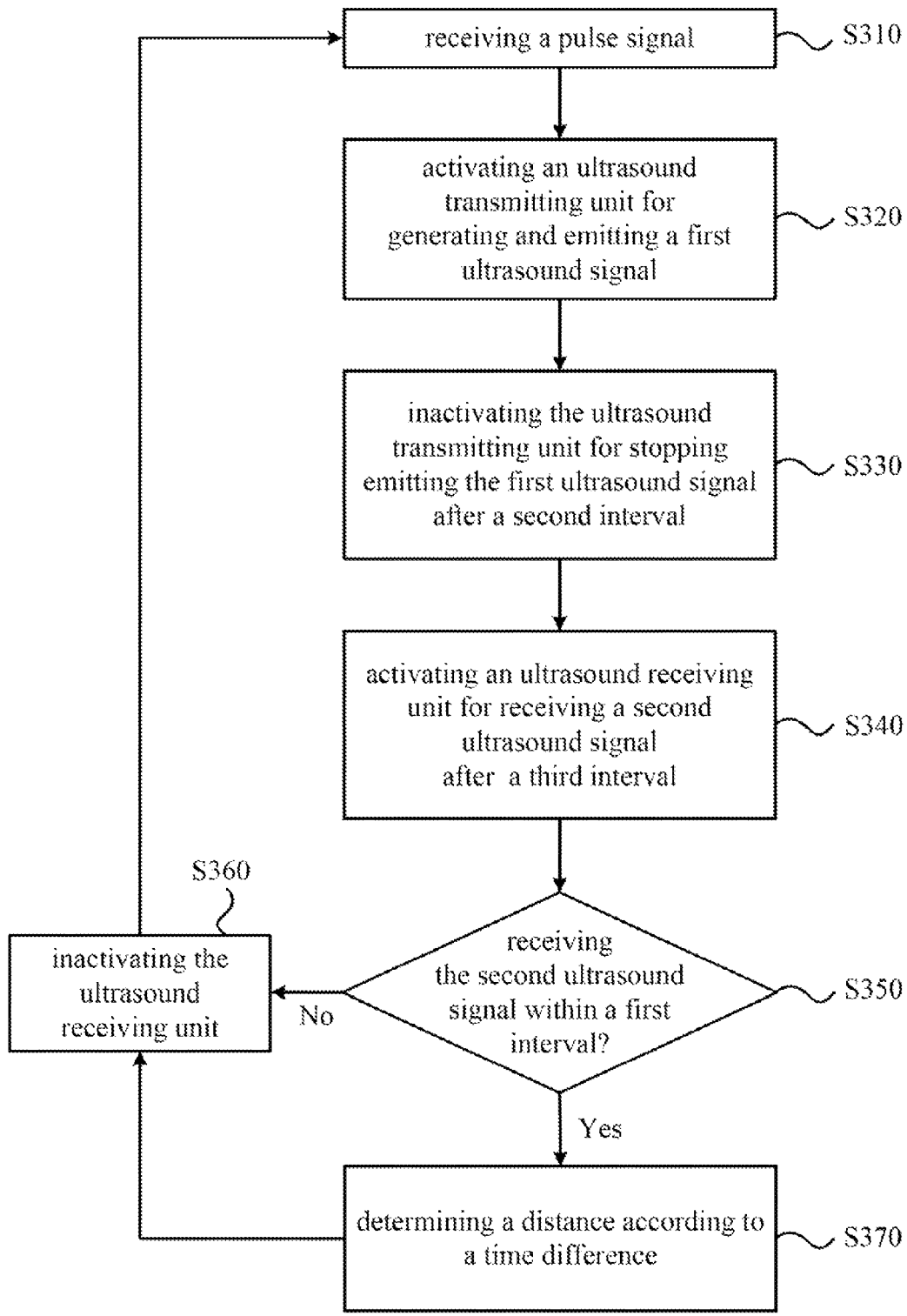
FIG. 3 depicts a flowchart of a distance measuring method according to one embodiment of the present disclosure.

In order to clearly describe the present embodiment, reference now is made to FIG. 2 and FIG. 3. FIG. 3 depicts a flowchart of a distance measuring method 300 according to one embodiment of the present disclosure. Operations of the distance measuring method 300 of FIG. 3 are described with the distance measuring apparatus 200 of FIG. 2, but present disclosure is not limited thereto.

First, in operation S310, the pulse signal PUS is received by the control module 230, in which the pulse signal PUS is generated by the GPS module 210. Next, in operation S320, the ultrasound transmitting unit 221 is activated by the control module 230 according to the pulse signal PUS. Additionally, the first ultrasound signal USS1 is generated by the ultrasound transmitting unit 221 which is controlled by the control module 230 and the first ultrasound signal USS1 is transmitted by the ultrasound transmitting unit 221. A time of transmitting the first ultrasound signal USS1 is tagged to be time t0 by the control module 230.

Next, operation S330 is executed. In operation S330, the ultrasound transmitting unit 221 is inactivated by the control module 230 such that the ultrasound transmitting unit 221 stops transmitting the first ultrasound signal USS1 after a period of time (e.g., a second interval T2) since the first ultrasound signal USS1 is transmitted. In order to avoid receiving the first ultrasound signal USS1 by the ultrasound transceiver module 220, operation S340 is executed after another period of time (e.g., a third interval T3) since the control module 230 inactivates the ultrasound transmitting unit 221. In operation S340, the ultrasound receiving unit 222 is activated by the control module 230 and the second ultrasound signal USS2 transmitted from the object (e.g., another vehicle) is received by the ultrasound receiving unit 222.

In one embodiment, the second interval T2 and the third interval T3 may be substantially 1 millisecond. In other words, if it is assumed that an error of a distance between the distance measuring apparatus 200 and another vehicle is substantially 0.34 meters, the second ultrasound signal USS2 can be received after 1 microsecond since the first ultrasound signal USS1 is stopped being transmitted. Therefore, the ultrasound receiving unit 222 can avoid receiving the first ultrasound signal USS1 generated from the ultrasound transmitting unit 221 when detecting other moving vehicles.

Next, in operation S350, a determination is made by the control module 230 as to whether the ultrasound receiving unit 222 receives the second ultrasound signal USS2 transmitted from another vehicle within the first interval T1. When the ultrasound receiving unit 222 does not receive the second ultrasound signal USS2 within the first interval T1, operation S360 is executed. In operation S360, the ultrasound receiving unit 222 is inactivated by the control module 230. Next, operation S310 is executed, that is, the GPS module 210 generates the next pulse signal PUS for next detection.

When the ultrasound receiving unit 222 receives the second ultrasound signal USS2 within the first interval T1, operation S370 is executed. operation S370, a time of receiving the second ultrasound is tagged to be time t1 by the control module 230. Accordingly, a time difference (t1−t0) between the time t1 of receiving the second ultrasound signal USS2 and the time t0 of transmitting the first ultrasound signal USS1 is obtained. In one embodiment, a distance between the object and the distance measuring apparatus 200 is determined by the control module 230 according to the time difference and the speed of sound at certain temperature. Next, operation S360 is executed.

Figure 4:
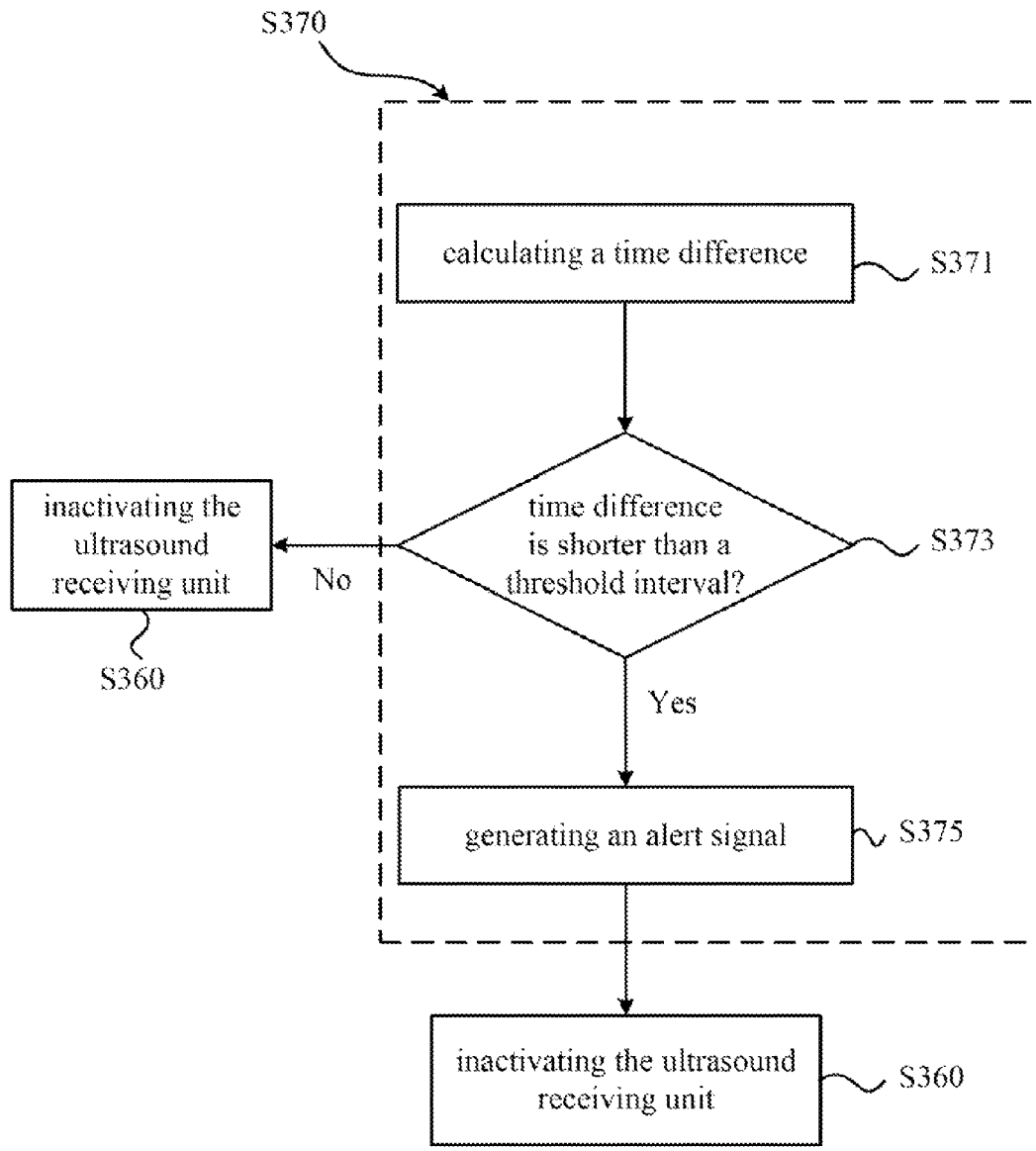
FIG. 4 depicts a flowchart of one of operations in Fig according to one embodiment of the present disclosure.

In one embodiment, an operation of determining a distance according to the time difference (t1−t0) can further includes several operations. As shown in FIG. 4, FIG. 4 depicts a flowchart of one of operations in FIG. 3 according to one embodiment of the present disclosure. First, in operation S371, the time difference (t1−t0) is calculated by the control module 230, in which the time difference (t1−t0) is between the time t1 of receiving the second ultrasound signal USS2 and the time of transmitting the first ultrasound signal USS1.

Next, in operation S373, a determination is made by the control module 230 as to whether the time difference (t1−t0) is shorter than a threshold time. In one embodiment, the threshold interval is an interval for the second ultrasound signal USS2 traveling through a safe distance between the distance measuring apparatus 200 and another vehicle. The user can set various safe distances according to the environment (e.g., a sunny day or a rainy day) so as to regulate a reacting time corresponding to the set safe distance. The control module 230 can calculate a corresponding threshold interval according to the set safe distance (e.g., the set safe distance is divided by the speed of sound at certain temperature). Moreover, the threshold interval must be shorter than the length of the first interval T1.

When time difference (t1−t0) is longer than or equal to the threshold interval, the control module 230 determines that there are no other vehicles approaching the distance measuring apparatus 200 within the safe distance. Next, operation S360 is executed. When the time difference (t1−t0) is shorter than the threshold time, the control module 230 determines that a vehicle is approaching within the safe distance. Next, operation S375 is executed. In operation S375, the alert module 240 is activated by the control module 230 so as to generate the alert signal ALM to the user. Accordingly, the user is noticed that a vehicle is approaching within the safe distance. Next, operation S360 is executed.

As illustrated from the aforementioned embodiments of the present disclosure, through synchronously and precisely generating a pulse signal by the GPS module, receiving an transmitted ultrasound signal and calculating a time difference between a time of receiving the ultrasound signal and a time of transmitting the ultrasound signal by the distance measuring apparatus, the driver can immediately detect whether a vehicle approaches the moving vehicle itself within a safe distance. Moreover, a distance between a vehicle with the distance measuring apparatus and another vehicle can be determined more precisely, and a detectable distance can be increased up to hundreds meters.

Although the present disclosure has been described in considerable detail with reference to certain embodiments thereof, other embodiments are possible, Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A distance measuring apparatus, comprising:
   a global positioning system (GPS) module configured to generate a pulse signal;
   an ultrasound transceiver module configured to generate and transmit a first ultrasound signal and receive a second ultrasound signal transmitted from an object; and
   a control module electrically coupled to the GPS module and the ultrasound transceiver module,
   wherein when the control module receives the pulse signal, the control module controls the ultrasound transceiver module to generate and transmit the first ultrasound signal, and determines whether the ultrasound transceiver module receives the second ultrasound signal within a first interval,
   wherein when the ultrasound transceiver module receives the second ultrasound signal within the first interval, the control module determines a distance between the distance measuring apparatus and the object according to a time difference between receiving the second ultrasound signal and transmitting the first ultrasound signal.

2. The distance measuring apparatus of claim 1, wherein the ultrasound transceiver module comprises:
   an ultrasound transmitting unit configured to transmit the first ultrasound signal; and
   an ultrasound receiving unit configured to receive the second ultrasound signal;
   wherein when the control module receives the pulse signal, the control unit activates the ultrasound transmitting unit to transmit the first ultrasound signal.

3. The distance measuring apparatus of claim 2, wherein the control module inactivates the ultrasound transmitting unit to stop transmitting the first ultrasound signal after a second interval since the control unit activates the ultrasound transmitting unit.

4. The distance measuring apparatus of claim 3, wherein the control unit activates the ultrasound receiving unit to receive the second ultrasound signal after a third interval since the control unit inactivates the ultrasound transmitting unit.

5. The distance measuring apparatus of claim 2, wherein when the ultrasound receiving unit does not receive the second ultrasound signal within the first interval, the control unit inactivates the ultrasound receiving unit.

6. The distance measuring apparatus of claim 1, further comprising an alert module electrically coupled to the control module, and configured to generate an alert signal, wherein when the time difference is shorter than a threshold time, the control module activates the alert module to generate the alert signal.

7. The distance measuring apparatus of claim 6, wherein the threshold interval is an interval for the second ultrasound signal traveling through a safe distance.

8. A distance measuring method, comprising:
   receiving a pulse signal generated from a GPS module;
   generating and transmitting a first ultrasound signal according to the pulse signal;
   determining whether a second ultrasound signal is received within a first interval; and
   determining a distance according to a time difference when the second ultrasound signal is received within the first interval, wherein the time difference is between receiving the second ultrasound signal and transmitting the first ultrasound signal.

9. The distance measuring method of claim 8, further comprising:
   stopping transmitting the first ultrasound signal after a second interval since receiving the pulse signal.

10. The distance measuring method of claim 9, wherein the step of determining whether the second ultrasound signal is received within the first interval comprises:
    determining whether the second ultrasound signal is received within the first interval after a third interval since stopping transmitting the first ultrasound signal.

* * * * *